(12) United States Patent
Krastel

(10) Patent No.: US 6,276,636 B1
(45) Date of Patent: Aug. 21, 2001

(54) GAS OR FLUID DE-ORGANIZERS FOR MOVING OBJECTS

(76) Inventor: Norman W. Krastel, 6435 Dona Linda Pl. NW., Albuquerque, NM (US) 87120

( * ) Notice: Subject to any disclaimer, the term of this patent is extended or adjusted under 35 U.S.C. 154(b) by 0 days.

(21) Appl. No.: 09/481,850

(22) Filed: Jan. 14, 2000

(51) Int. Cl.⁷ .................................................. B64C 23/00
(52) U.S. Cl. ........................ 244/130; 244/199; 244/200; 296/180.1
(58) Field of Search .................................. 244/130, 199, 244/198, 204, 200, 213; 296/180.1

(56) References Cited

U.S. PATENT DOCUMENTS

| | | |
|---|---|---|
| D. 306,993 | 4/1990 | Nitzke . |
| D. 408,771 | 4/1999 | Johnston . |
| 2,261,558 * | 11/1941 | Orloff .................................. 244/130 |
| 2,650,752 * | 9/1953 | Hoadley ............................... 244/199 |
| 2,800,291 * | 7/1957 | Stephens .............................. 244/200 |
| 2,873,931 * | 2/1959 | Fleischmann ......................... 244/200 |
| 3,186,753 | 6/1965 | Steffanoff . |
| 3,612,446 * | 10/1971 | Lebert ................................... 244/200 |
| 4,006,931 | 2/1977 | Groves . |
| 4,142,727 | 3/1979 | Shaw et al. . |
| 4,655,419 * | 4/1987 | van der Hoeven ................... 244/199 |
| 4,960,283 | 10/1990 | Gobush . |
| 5,058,837 * | 10/1991 | Wheeler ............................... 244/199 |
| 5,108,145 | 4/1992 | Harris . |
| 5,114,099 * | 5/1992 | Gao ....................................... 244/200 |
| 5,171,623 * | 12/1992 | Yee ....................................... 244/130 |
| 5,184,832 | 2/1993 | Miwa . |
| 5,542,630 * | 8/1996 | Savill ................................... 244/200 |
| 5,544,931 | 8/1996 | Nelson . |
| 5,820,203 | 10/1998 | Morelli et al. . |
| 5,833,305 | 11/1998 | Watzlawick et al. . |
| 5,842,937 | 12/1998 | Dalton et al. . |

OTHER PUBLICATIONS

"Bumps to the Rescue", Murray, Popular Science Magazine, Jul. 1998.

* cited by examiner

*Primary Examiner*—Galen L. Barefoot
(74) *Attorney, Agent, or Firm*—Dennis F. Armijo

(57) ABSTRACT

Tabs are placed on a moving object in order to de-organize the fluid or air, passing over the moving object. The tabs can be any type of protrusion on the body of the moving object. The placement, size, and number of tabs depends on the size and contour of the moving object and can be optimized by testing. The use of these tabs causes less friction between the fluid or air and the object, and increases the efficiency and stability of the moving object. Additionally, dimpled strips can be used to de-organize the fluid in lieu of tabs.

6 Claims, 3 Drawing Sheets

GAS OR FLUID DE-ORGANIZERS FOR MOVING OBJECTS

BACKGROUND OF THE INVENTION

1. Field of the Invention (Technical Field)

This invention relates to an apparatus and method of using fluid or wind de-organizers which are mounted on moving objects such as, but not limited to, motor vehicles, or to objects over which liquids or air flows.

2. Background Art

Since the creation of motor vehicles, designers and engineers have attempted to reduce air drag to increase the efficiency of the vehicle. Aerodynamic designs have proliferated throughout the years. Initially, it was believed that the smoother the surface, the faster and more fuel efficient the motor vehicle would be. However, it appeared that the opposite results were obtained. These results were confirmed with the design of golf balls. When dimples were added to the surface of golf balls, they would travel farther. The placement and texture of the dimples is the subject of several patents such as U.S. Pat. No. 5,842,937 to Dalton, et al., U.S. Pat. No. 4,960,283 to Gobush, and U.S. Pat. No. 4,142,727 to Shaw, et al. The purpose of these wind de-organizers is to disturb the air flow so as to reduce the friction as the air passes over the object, or the object passes through the air. Air passing over a smooth object creates friction between the smooth surface and the air. By placing dimples or "chevrons" on the surface of airplanes, skin friction can be reduced by thirteen percent (13%). "Bumps to the Rescue", Murray, *Popular Science*, 1998. The present invention takes this concept one step further. By fastening tabs or adding protrusions to the surface of a motor vehicle, the performance and fuel efficiency of the vehicle can be enhanced. In addition, the stability of the vehicle is increased by the use of the tabs or protrusions.

Most prior art for air diverting apparatuses are used for deflecting the air flow from a certain portion of the vehicle for noise reduction and the like. These include U.S. Pat. No. 3,186,753 to Steffanoff and U.S. Pat. No. 5,833,305 to Watzlawick, et al. Other spoiler devices are designed to direct the air flow in a manner to keep the vehicle on the road surface, such as U.S. Pat. No. 5,544,931 to Nelson. Spoilers such as rear spoilers on automobiles do nothing to help the air flow over a vehicle. They merely use the air that has already passed over the vehicle to create a down force to the rear end of the vehicle.

Other prior art patents, such as U.S. Pat. No. 5,820,203 to Morelli, teach the use of fan blades attached to the wheels of a vehicle, venting air to the bottom edge of a truncated tail to form stationary ring vortex, which reduces drag.

U.S. Pat. No. 5,108,145 to Harris discloses the use of a plurality of cavities on a rear portion of a tractor trailer for reduction of drag.

Front spoilers merely keep air from getting underneath the vehicle so as to help eliminate lift or in effect, making the vehicle stick to the road better.

However, none of the prior art discloses the use of air de-organizers, placed to break up the smooth flow of air over the motor vehicle to improve the efficiency of the motor vehicle.

SUMMARY OF THE INVENTION
(DISCLOSURE OF THE INVENTION)

In accordance with the present invention, there is provided a method and apparatus for de-organizing a liquid or gas flowing over an object to break up the smooth flow of air or liquid, thus reducing friction and improving the efficiency of the flow or movement of the object. The preferred apparatus for increasing the efficiency of a fluid or gas flowing over an object comprises wind de-organizers affixed to the object for breaking up a smooth flow of the liquid or gas over the object. The preferred wind de-organizers comprise tabs. The tabs are preferably affixed to the object at random angles between ±30° and ±45° to a direction of the fluid or gas flow. The wind de-organizers can also comprise protrusions. The wind de-organizers can also comprise dimples. The preferred dimples comprise apertures.

The preferred apparatus for de-organizing a fluid or gas passing over a moving object comprises a plurality of tabs affixed to the moving object. The preferred tabs comprise L shaped structures. The tabs can also comprise protrusions on a body of the moving object. The preferred protrusions comprise an integral part of the body of the moving object. The plurality of tabs are preferably affixed to the moving object in a random pattern. The preferred random pattern comprises affixing the tabs randomly at angles in a range between ±30° to ±45° to a direction of movement of the moving object. The plurality of tabs can comprise different sized tabs. The plurality of tabs can be removably affixed to the moving object.

The preferred method of de-organizing a fluid passing over an object comprises the steps of providing tabs and affixing the tabs to the object so the fluid or air passes over the tabs. The alternative step of providing tabs comprises providing protrusions. The preferred step of affixing the tabs to the object so the fluid or air passes over the tabs comprises randomly affixing the tabs at angles in a range between ±30° to ±45° to a direction of a flow of the fluid or air.

A primary object of the present invention is to improve the fuel efficiency of motor vehicles.

Another object of the present invention is to improve the stability of a motor vehicle.

Yet another object of the invention is to improve the efficiency of vehicles in water.

Another object of the invention is to improve the efficiency of air conditioning ducts.

A primary advantage of the present invention is that it is simple and inexpensive to apply to existing motor vehicles.

Another advantage of the present invention is the reduction of air noise on motor vehicles.

Yet another advantage of the present invention is the simplicity of installation of the de-organizers.

Another advantage of the present invention is its simplicity to manufacture.

Another advantage is the versatility of the invention. It can be used on motor vehicles, boats, trailers, helmets, and any other object over which air or liquid flows.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The air foil apparatus and method of the present invention increases the fuel efficiency and stability of motor vehicles. Although this disclosure discusses only automobiles and trucks, the apparatus and method can be used for other applications where any liquid passes over a surface. This can include boats in water, airplanes, trailers, helmets, and the like. To help eliminate friction from air passing over the vehicle, the present invention comprises tabs which can be fastened to the object to break up the smooth flow of air, thereby making the transmission of said object, or air, much more efficient.

Figure 1:
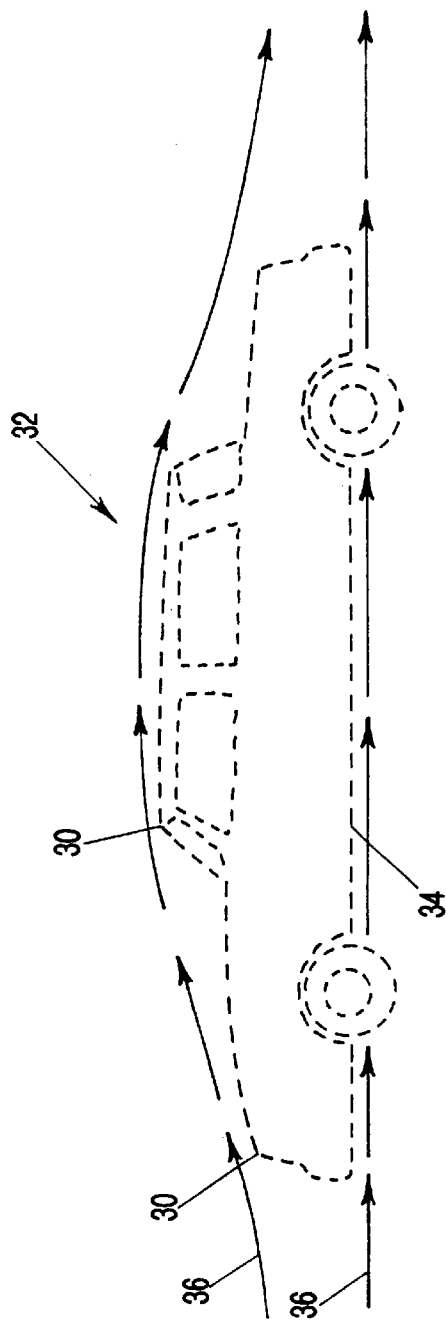
FIG. 1 depicts the flow of air over the smooth surface of a motor vehicle.
Figure 2:
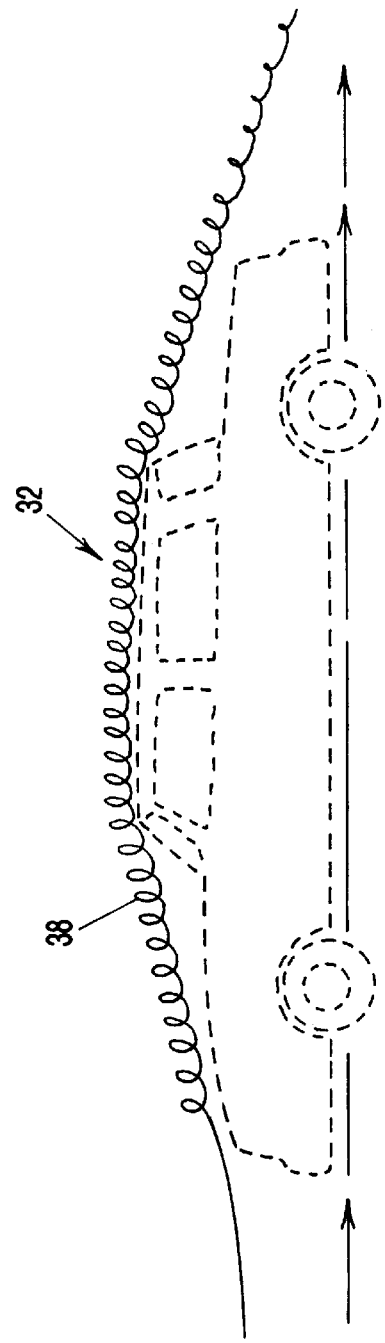
FIG. 2 depicts the air flow over a motor vehicle using wind de-organizers.

As shown in FIG. 1, the round top surfaces 30 of an automobile 32 combined with the relatively flat bottom 34 of the vehicle 32 combine to create a wind effect air 36 passing over round top surfaces 30 and under flat bottom 34, which creates lift which is unwanted in a vehicle as it makes it light on the road, with less adhesion to the road surface. If the air 36 passing over the vehicle 32 is spoiled or de-organized 38, this wing effect or lift is reduced, thereby improving road adhesion, as shown in FIG. 2.

Figure 3:
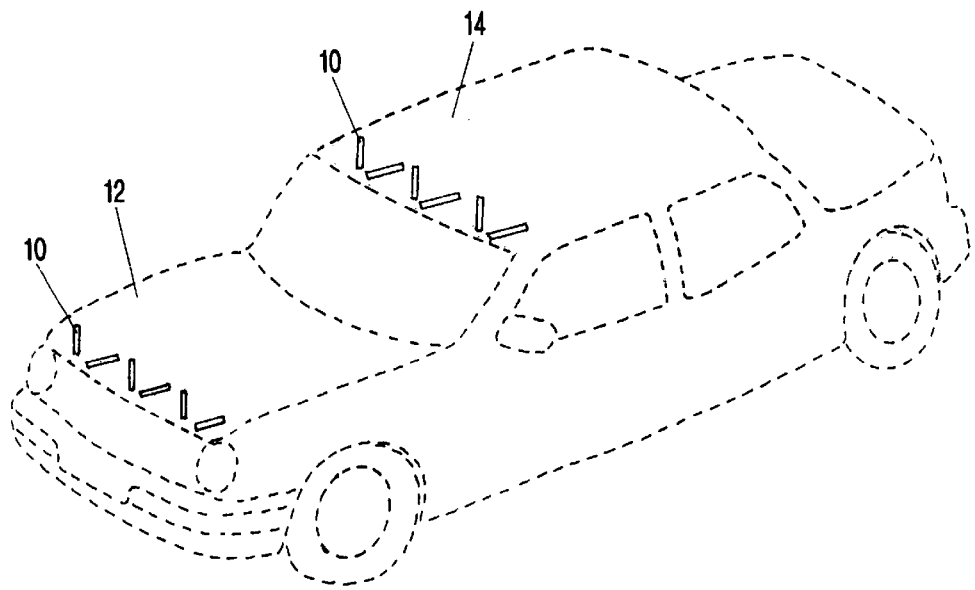
FIG. 3 shows tabs affixed to a motor vehicle.
Figure 4:
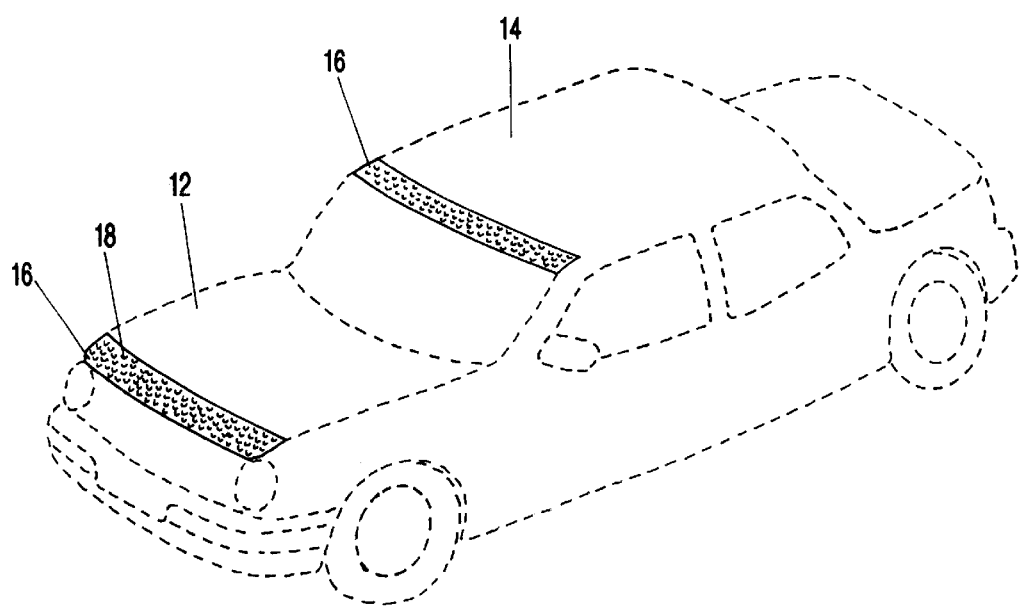
FIG. 4 shows an alternative embodiment of the invention using dimpled strips.

To illustrate the invention, FIG. 3 shows an automobile hood 12 and roof section 14 with tabs 10 attached. The size and location of tabs 10 is determined by the size and shape of the object to which they are applied. In other words, the application determines the number of, and size and shape of tabs. The larger the object to which the tabs are to be attached, the more tabs and different size are required. The tabs spoil the smooth flow of air into a kind of mild turbulence which creates less friction with the surface involved. FIG. 4 shows an alternative embodiment using a strip of material 16, preferably 3 inches wide by the length necessary to cover the leading edge of the hood 12 and the roof section 14, or any area over which air flows. Strips 16 would have dimples 18 on them in a random pattern so as to break up the smooth flow of air. Dimples 18 are preferably perforations or apertures in the strip 16. The perforations or apertures can be of different sizes and shapes. Although strips 16 are only shown on the hood and roof of the vehicle, it may also be necessary to use other strips 16 along other parts of the body if it is a large body such as a semi-trailer, or the like (not shown). As with the preferred embodiment, the size of the strips and the size of the dimples can be varied depending on the size of the surface over which the air flows. Additionally, protrusions molded onto the body part itself can be used (not shown). Again, these protrusions are used to break up the smooth flow of air over the body part.

In the case of water vehicles, the tabs may be installed both above and below the water line for increased benefits (not shown).

Figure 5:
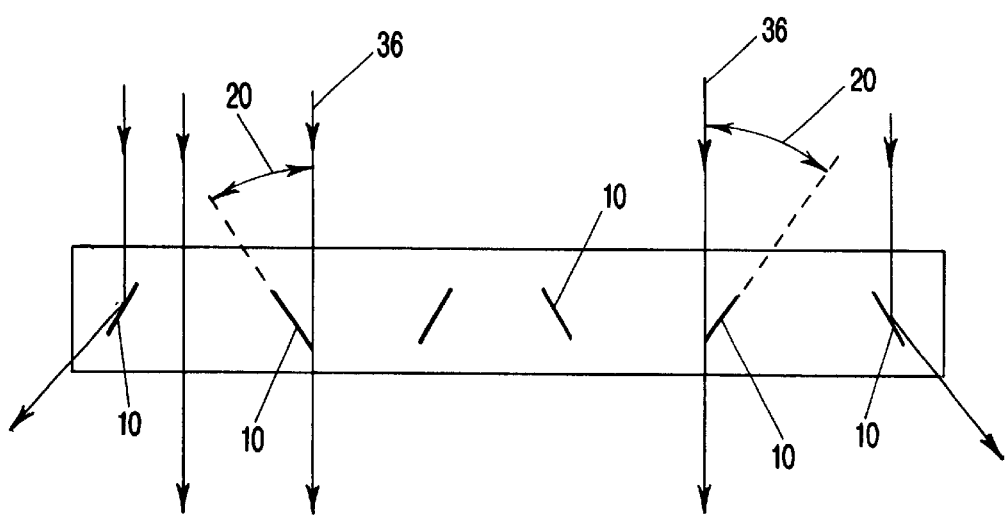
FIG. 5 shows the tabs affixed to a strip at the preferred angles.

In using the tabs or strips, several methods of fastening can be embodied. They may be fastened with double sided tape, or glued on or in the case of tabs, they may be fastened to a strip for installation, as shown in FIG. 5. In this case the strips can be either molded in the strip or fastened to the strip. Additionally, the tabs may be protrusions in the body part itself using classic molding processes which are well known in the art.

FIG. 5 shows how the preferred tabs are randomly positioned at angles 20 of plus or minus 30 degrees (±30°) to plus or minus 45 degrees (±45°) to the direction of movement of the vehicle, air flow or liquid flow 36. In other words, a first tab can be positioned at +30°, the second at −40°, the third at +45°, and so on. Tabs 10 are of varying sizes depending on the usage, (i.e., automobile, semi trailer, boat, submarine, air conduction pipes for heating, cooling, or ventilating, liquids through transmission pipes, etc). The number and placement of tabs 10 as well as the size would vary as to their application.

This invention can be used on motor vehicles, semi truck trailers, water vehicles, aircraft, and sea containers used for shipping. The tabs can also be used inside air ducts such as air conditioning and heating ducts. The tabs can be used to increase performance on race vehicles. In the case of open race cars, the tabs can be used on crash helmets to help prevent the buffeting of the driver's head by wind.

Industrial Applicability

The invention is further illustrated by the following non-limited examples.

The gas mileage was measured at a minimum of 29 miles per gallon (MPG) on a 1995 Mitsubishi Expo over 34,000 miles. Tabs were added to the hood and roof of the same vehicle as shown in FIG. 2. The tabs were L shaped pieces of aluminum and measured ½" by ½"×⅟16" by 1½" to 2" long. The tabs were affixed to the body of the vehicle with double sided tape. Six tabs were mounted to the leading edge of the hood and six were mounted to the leading edge of the roof. The tabs were mounted at random angles from the direction of forward movement, with the first tab at an angle of +30, the second at −45°, the third at an angle +45°, the fourth at an angle of −30°, the fifth at an angle of +45°, and the sixth at an angle of −45°.

On the first test run the vehicle was driven 153.4 miles at a constant speed of 75 miles per hour (MPH). The vehicle used 4.804 gallons of gas, for 31.723 MPG. On the second test run the vehicle was driven 153 miles at a constant speed of 75 MPH. The vehicle used 4.76 gallons of gas, for 32.14 MPG. These test results show a minimum nine percent (9%) increase in fuel efficiency using the tabs as set forth in the disclosure. The resulting efficiency can be increased by optimizing the placement and size of the tabs.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. An apparatus for increasing the efficiency of a fluid or gas flowing over an object, the apparatus comprising a plurality of wind de-organizers comprising random sized tabs affixed at random angles to said object for breaking up a smooth flow of said liquid or gas over said object in a disorganized manner.

2. The invention of claim 1 wherein said tabs affixed to said object at random angles comprise angles between ±30° and ±45° to a direction of said fluid or gas flow.

3. An apparatus for de-organizing a fluid or gas passing over a moving object, the apparatus comprising a plurality of blunt L shaped tabs affixed in a random pattern to said moving object.

4. The invention of claim 1 wherein said random angles comprise a range between ±30° to ±45° to a direction of movement of said moving object.

5. The invention of claim 3 wherein said plurality of blunt tabs comprise different sized tabs.

6. The invention of claim 3 wherein said plurality of blunt tabs are removably affixed to said moving object.

* * * * *